(12) United States Patent
Takii

(10) Patent No.: US 9,573,513 B2
(45) Date of Patent: Feb. 21, 2017

(54) VEHICULAR HEADLAMP

(71) Applicant: KOITO MANUFACTURING CO., LTD., Tokyo (JP)

(72) Inventor: Naoki Takii, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 80 days.

(21) Appl. No.: 14/307,946

(22) Filed: Jun. 18, 2014

(65) Prior Publication Data

US 2015/0009699 A1 Jan. 8, 2015

(30) Foreign Application Priority Data

Jul. 5, 2013 (JP) .................................. 2013-141904

(51) Int. Cl.
 *F21V 19/02* (2006.01)
 *B60Q 1/076* (2006.01)
 *B60Q 1/10* (2006.01)
 *B60Q 1/12* (2006.01)

(52) U.S. Cl.
 CPC ................. *B60Q 1/076* (2013.01); *B60Q 1/10* (2013.01); *B60Q 1/12* (2013.01)

(58) Field of Classification Search
 CPC ................................................. F21S 48/1742
 USPC ............................ 362/523; 250/205; 353/83
 See application file for complete search history.

(56) References Cited

U.S. PATENT DOCUMENTS

| 2007/0058380 A1* | 3/2007 | Tajima | ..................... B60Q 1/12 362/464 |
| 2008/0106909 A1* | 5/2008 | Kusagaya | ............ B60Q 1/0683 362/524 |
| 2008/0112181 A1* | 5/2008 | Tatara | .................. B60Q 1/0683 362/524 |

FOREIGN PATENT DOCUMENTS

JP 2008094196 4/2008

* cited by examiner

*Primary Examiner* — Anh Mai
*Assistant Examiner* — Matthew Peerce
(74) *Attorney, Agent, or Firm* — Abelman, Frayne & Schwab

(57) ABSTRACT

An object of the present disclosure is to provide a vehicular headlamp having good mountability onto a vehicle body by forming a vehicular headlamp in conformity with a mounting space for the vehicular headlamp formed in a vehicle body. The vehicular headlamp includes a lamp unit provided with a light source and configured to be pivotable in a predetermined direction; an actuator configured to pivot the lamp unit to adjust an irradiation direction of light emitted from the light source; and a connecting mechanism configured to connect the lamp unit and the actuator to transmit a driving force of the actuator to the lamp unit. The actuator is disposed in front of or behind the lamp unit. Therefore, the vehicular headlamp is formed in conformity with a mounting space for the vehicular headlamp formed in a vehicle body, and thus, good mountability onto a vehicle body may be ensured.

5 Claims, 12 Drawing Sheets

VEHICULAR HEADLAMP

CROSS-REFERENCE TO RELATED APPLICATIONS

This application is based on and claims priority from Japanese Patent Application No. 2013-141904 filed on Jul. 5, 2013, with the Japan Patent Office, the disclosure of which is incorporated herein in its entirety by reference.

TECHNICAL FIELD

The present disclosure relates to a technical field of a vehicular headlamp in which a lamp unit is configured to be pivotable such that an optical axis of light emitted from a light source may be adjusted.

BACKGROUND

A certain type of a vehicular headlamp is provided with a lamp unit having a light source in which the lamp unit is disposed in a lamp case configured by a cover and a lamp housing, and is configured to be pivotable by a driving force of an actuator (see, e.g., Japanese Patent No. 4688220).

In such a vehicular headlamp, for example, the lamp unit is pivoted in the upward and downward direction by the actuator so as to perform a so-called leveling adjustment. The leveling adjustment refers to an adjustment of deviation of an optical axis changed with weight of in-vehicle loads.

In the vehicular headlamp as disclosed in Japanese Patent No. 4688220, a pivot fulcrum portion is provided above the lamp unit and the actuator is provided below the lamp unit such that the lamp unit is pivoted about the pivot fulcrum portion by a driving force of the actuator, adjusting the optical axis.

SUMMARY

However, in the vehicular headlamp as disclosed in Japanese Patent No. 4688220, since the pivot fulcrum portion and the actuator are provided above and below the lamp unit, respectively, it is necessary to form the vehicular headlamp in a shape extending in an up and down direction.

In vehicles such as automobiles, however, a front end portion of a vehicle body recently tends to be greatly inclined with respect to the upward and downward direction, and there is a problem in that it is difficult to mount a vertically extending vehicular headlamp in a headlamp mounting space formed in the vehicle body.

In order to overcome the above-mentioned problems, an object of the present disclosure is to provide a vehicular headlamp having good mountability by forming the vehicular headlamp in a shape to be in conformity with a headlamp mounting space formed in a vehicle body.

The vehicular headlamp according to the present disclosure includes a lamp unit provided with a light source and configured to be pivotable in a predetermined direction; an actuator configured to pivot the lamp unit to adjust an irradiation direction of light emitted from the light source; and a connecting mechanism configured to connect the lamp unit and the actuator to deliver a driving force of the actuator to the lamp unit. The actuator is disposed in front of or behind the lamp unit.

Accordingly, the actuator and the lamp unit are disposed back and forth.

According to the present disclosure, since the actuator is disposed in front or behind the lamp unit, the vehicular headlamp is formed in conformity with a mounting space for the vehicular headlamp formed in a vehicle body, and thus, good mountability onto a vehicle body may be ensured.

The above-described summary is illustration purposes only and does not intend to limit in any ways. In addition to the illustrative embodiment, examples, and features described above, additional embodiment, example, and features will become apparent by referring to the drawings and the following detailed description.

DETAILED DESCRIPTION

In the following detailed description, reference is made to the accompanying drawing, which form a part hereof. The illustrative exemplary embodiments described in the detailed description, drawings, and claims are not meant to be limiting. Other exemplary embodiments may be utilized, and other changes may be made, without departing from the spirit or scope of the subject matter presented here.

Hereinafter, exemplary embodiments for implementing a vehicular headlamp of the present disclosure will be described with reference to the accompanying drawings.

<Schematic Configuration of Vehicular Headlamp>

Vehicular headlamps 1 are mounted at both left and right end portions in a front end of a vehicle body.

Figure 1:
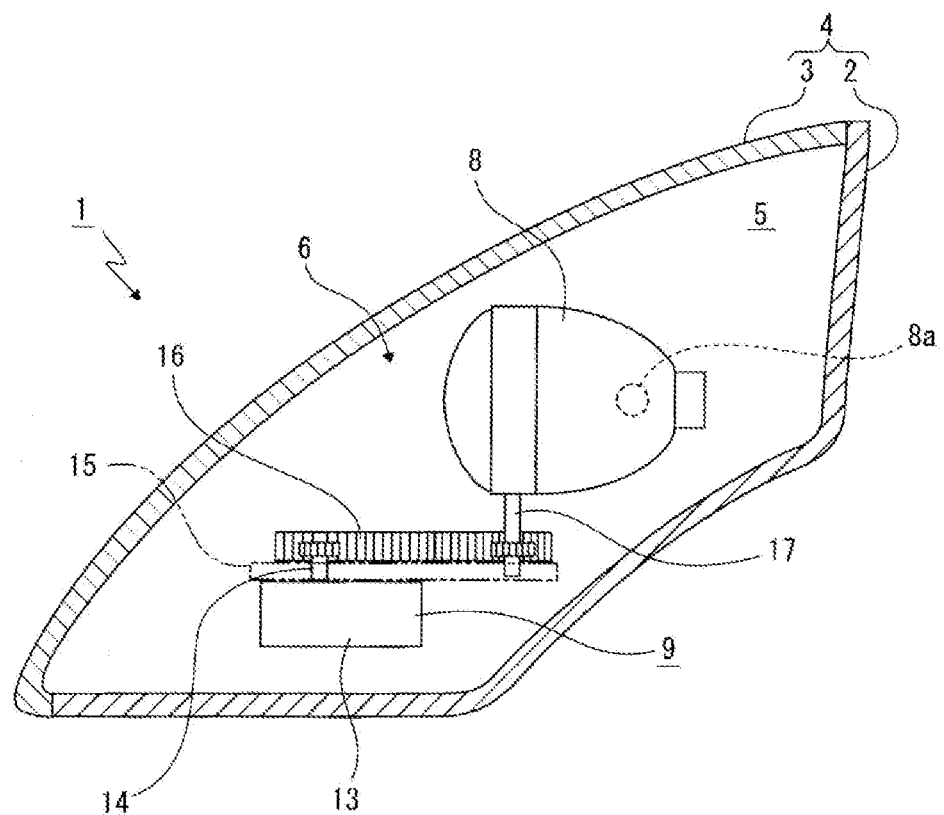
FIG. 1 illustrates an exemplary embodiment of the present disclosure along with FIGS. 2 to 12, and is a schematic longitudinal cross-sectional view of a vehicular headlamp.

Each vehicular headlamp 1 includes a lamp housing 2 having a concave portion which is opened to an upwardly inclined front side, and a cover 3 configured to close an opening of the lamp housing 2, as illustrated in FIG. 1. A lamp case 4 is configured by the lamp housing 2 and the cover 3 and an internal space of the lamp case 4 is formed as a lamp chamber 5.

The vehicular headlamp 1 is inclined so as to be displaced upward as it goes rearward, and disposed such that the cover 3 faces the upwardly inclined front side.

An internal structure 6 according to the first exemplary embodiment is disposed in the lamp chamber 5. The internal structure 6 is provided with a bracket 7, a lamp unit 8, and an actuator 9 (see, e.g., FIGS. 1 and 2).

Further, in the lamp chamber 5, an internal structure according to the second exemplary embodiment, an internal structure according to the third exemplary embodiment, and an internal structure according to the fourth exemplary embodiment, as described below, may be disposed instead of the internal structure 6 according to the first exemplary embodiment.

Internal Structure According to First Exemplary Embodiment

Figure 2:
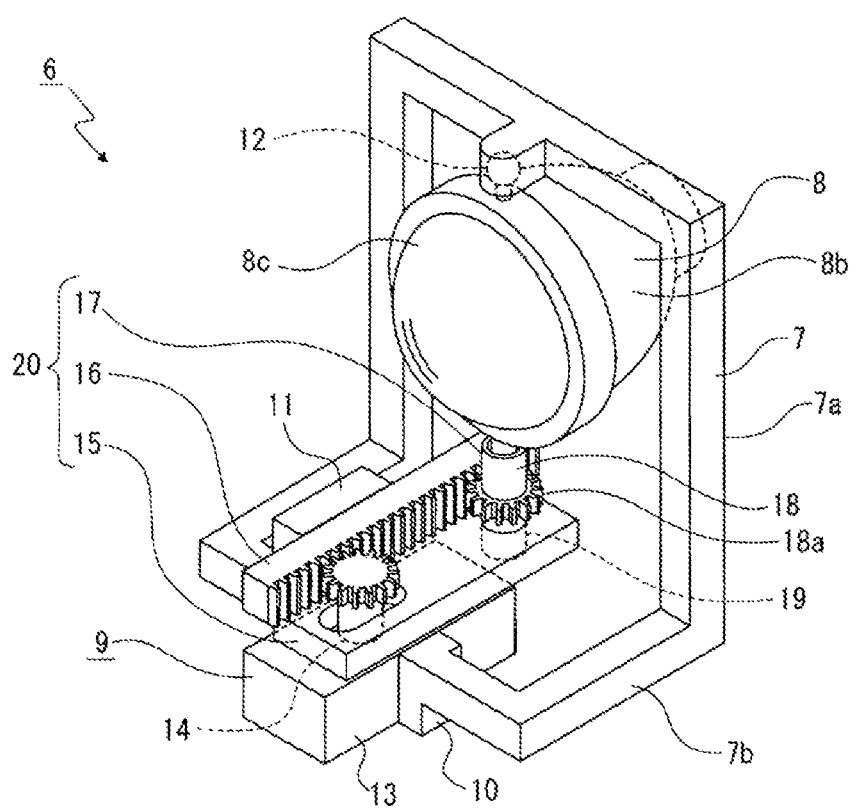
FIG. 2 is a perspective view of an internal structure according to a first exemplary embodiment.

Hereinafter, a configuration of the internal structure 6 according to the first exemplary embodiment will be described in detail (see, e.g., FIGS. 2 to 4).

The bracket 7 is constituted with a U-shaped first portion 7a that is opened downward, and a U-shaped second portion 7b that is opened rearward. A lower end portion of the first portion 7a and a rear end portion of the second portion 7b are provided to be continued.

Actuator mounting portions 10, 10 and a guide 11 are provided in the front end portion of the second portion 7b of the bracket 7.

The lamp unit 8 is, for example, a projector-type unit provided with a light source 8a, a reflector 8b, and a projector lens 8c. A fulcrum shaft 12 is mounted on an upper end portion of the lamp unit 8. The lamp unit 8 is connected to an upper end portion of the first portion 7a of the bracket 7 through the fulcrum shaft 12 to be pivotable in an up and down direction as well as pivotable in a left and right direction with respect to the bracket 7.

The actuator 9 functions to adjust an optical axis of the lamp unit 8, and is disposed below and in front of the lamp unit 8. The actuator 9 performs a leveling adjustment for adjusting a direction of the optical axis changed according to, for example, weight of in-vehicle loads by pivoting the lamp unit 8 vertically about the bracket 7, as well as a swivel adjustment for adjusting a direction of the optical axis in accordance with a travelling direction of the vehicle by pivoting the lamp unit 8 in the leftward and rightward direction about the bracket 7.

The actuator 9 includes a main body 13 provided with, for example, a driving gear (not illustrated) therein, and a driving shaft 14 protruding upward from the main body 13 to be moved or rotated by the driving gear in a forward and rearward direction. The main body 13 of the actuator 9 is mounted on the actuator mounting portions 10, 10.

A gear unit 14a is formed on a peripheral surface of the driving shaft 14.

A slider 15 is disposed above the main body 13. The slider 15 is configured to be movable in the forward and backward direction. The slider 15 is formed with two inserting holes to be spaced apart from each other in the forward and backward direction. The driving shaft 14 passes through the front inserting hole and protrudes upward from the slider 15.

A rack 16 is disposed above the slider 15. The rack 16 is configured to be movable and is guided along with the slider 15 by the guide 11 to be moved in the forward and rearward direction. The rack 16 is engaged with the gear unit 14a of the driving shaft 14. Accordingly, when the driving shaft 14 is rotated, the rack 16 is guided by the guide 11 and moved integrally with the slider 15 in the forward and backward direction.

A connecting shaft 17 is disposed behind the driving shaft 14. The connecting shaft 17 is constituted with a connecting portion 18 positioned in the upward and downward direction and an inserting portion 19. A pinion gear unit 18a is formed on a peripheral surface of a part of the connecting portion 18. The inserting portion 19 is inserted through the rear inserting hole of the slider 15.

In the connecting shaft 17, an upper end portion of the connecting portion 18 is connected to a lower end portion of the lamp unit 8. The lamp unit 8 is configured to be pivotable in the upward and downward direction about the connecting portion 18.

The slider 15, the rack 16, and the connecting shaft 17 function as a connecting mechanism 20 that transmits the driving force of the actuator 9 to the lamp unit 8.

Figure 3:
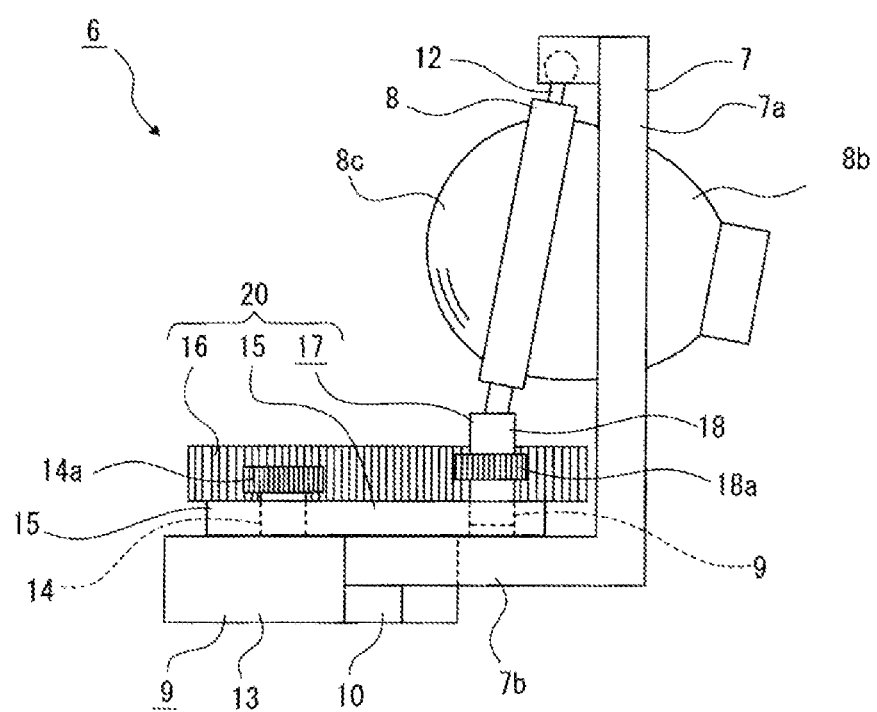
FIG. 3 is a side view illustrating a state in which a leveling adjustment is performed in an internal structure according to the first exemplary embodiment.

In the internal structure 6 configured as described above, when the driving shaft 14 of the actuator 9 is moved in the forward and backward direction, the slider 15, the rack 16, and the connecting shaft 17 are moved integrally with the driving shaft 14 in the forward and backward direction, and the lamp unit 8 is pivoted in the upward and downward direction about the fulcrum shaft 12 as a fulcrum, thereby performing the leveling adjustment (see, e.g., FIG. 3). When the leveling adjustment is performed, the connecting shaft 17 is moved in the upward and downward direction with respect to the rack 16 in accordance with the pivot of the lamp unit 8. The connecting shaft 17 is moved in the upward and downward direction within a range in which the engagement state of the pinion gear unit 18a and the rack 16 is maintained.

Figure 4:
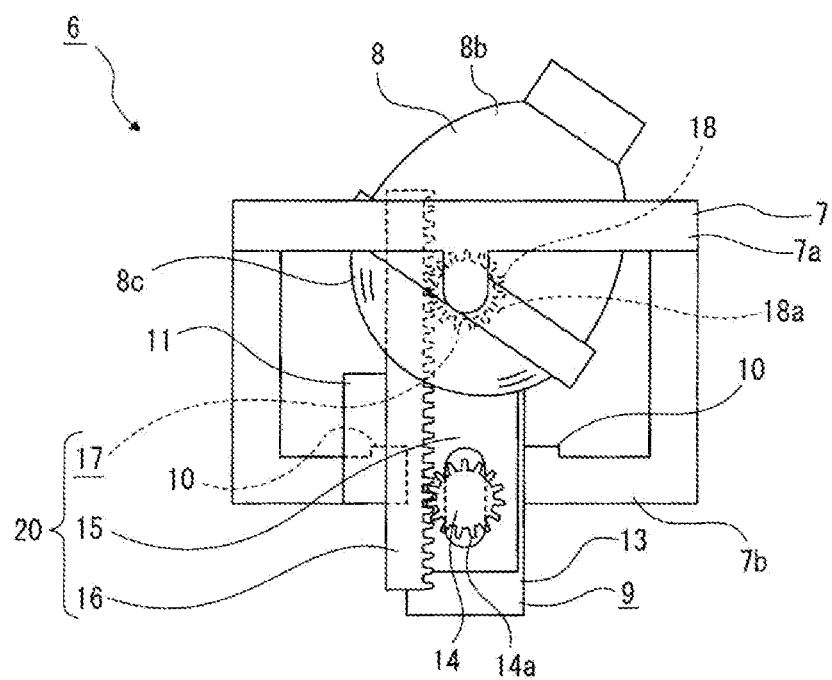
FIG. 4 is a plan view illustrating a state in which a swivel adjustment is performed in the internal structure according to the first exemplary embodiment.

Meanwhile, when the driving shaft 14 of the actuator 9 is rotated, the rack 16 is moved in the forward and backward direction in accordance with the rotation of the driving shaft 14, the connecting shaft 17 is rotated about the rack 16, and the lamp unit 8 is pivoted in the leftward and rightward direction about the fulcrum shaft 12 as a fulcrum, thereby performing the swivel adjustment (see, e.g., FIG. 4).

In the internal structure 6 configured as described above, since the driving force of the actuator 9 is transmitted from the driving shaft 14 to the lamp unit 8 through the slider 15 or the rack 16, the number of driving elements is small. Therefore, a driving loss may be reduced, and a structure may be simplified.

Modified Example of Internal Structure According to First Exemplary Embodiment

Figure 5:
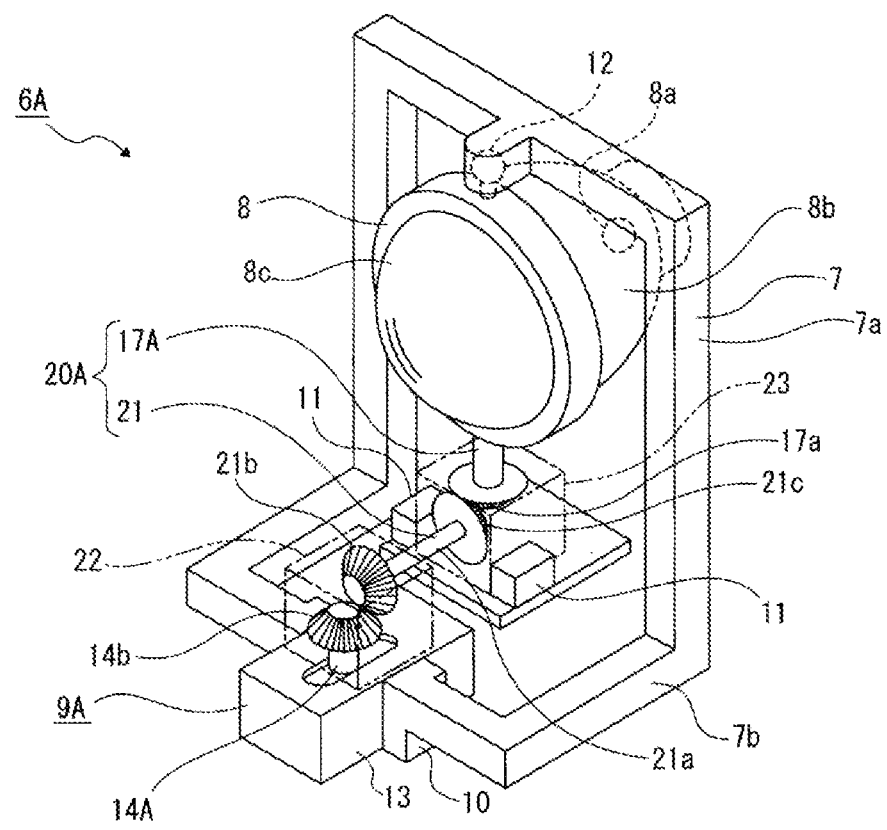
FIG. 5 is a perspective view illustrating a first modified example of the internal structure according to the first exemplary embodiment.
Figure 6:
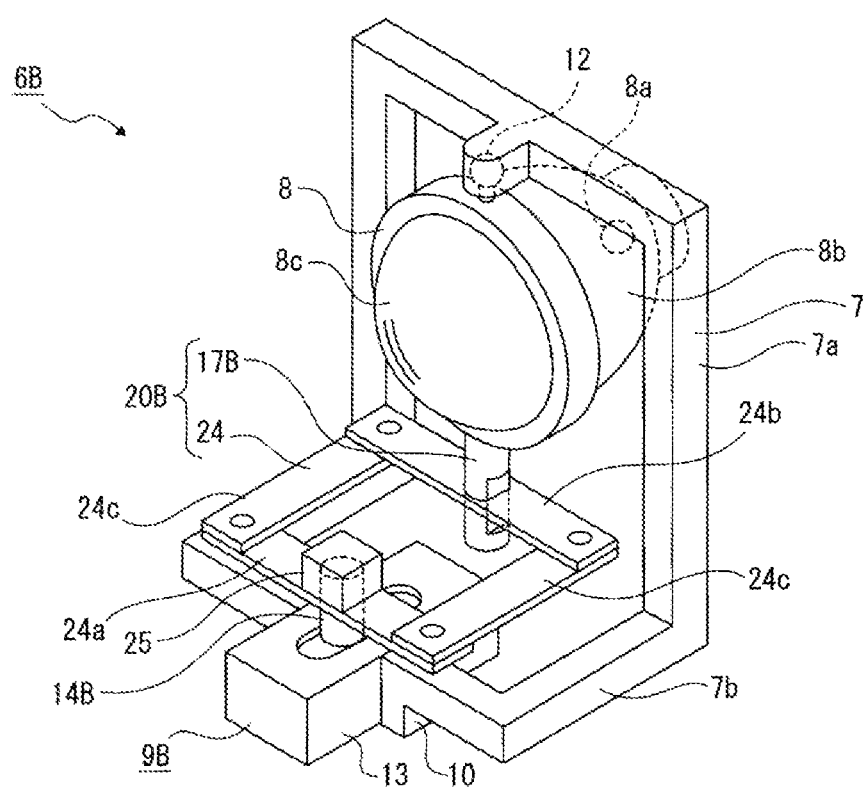
FIG. 6 is a perspective view illustrating a second modified example of the internal structure according to the first exemplary embodiment.
Figure 7:
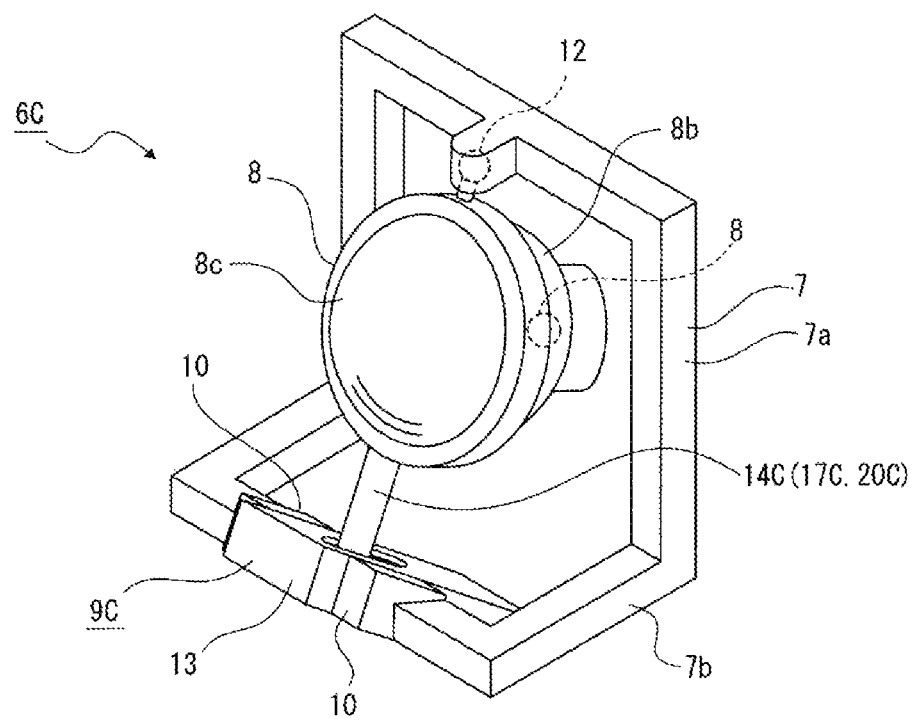
FIG. 7 is a perspective view illustrating a third modified example of the internal structure according to the first exemplary embodiment.

Hereinafter, a modified example of the internal structure according to the first exemplary embodiment will be described (see, e.g., FIGS. 5 to 7).

First of all, an internal structure 6A according to the first modified example will be described (see, e.g., FIG. 5).

Further, in the internal structure 6A as illustrated below, only a connecting mechanism and its associated structure are different from the above-described internal structure 6. Thus, only the portions different from those of the internal structure 6 will be described in detail and the other portions will be denoted by the same reference numerals those given to the same portions as in the internal structure 6 while omitting the descriptions thereof.

The internal structure 6A according to the first modified example is provided with a bracket 7, a lamp unit 8, and an actuator 9A.

Below the lamp unit 8, guides 11, 11 are disposed to be spaced apart from each other in the leftward and rightward direction.

The actuator 9A is disposed below and in front of the lamp unit 8. The actuator 9A is provided with a main body 13 and a driving shaft 14A. A bevel gear unit 14b is provided in an upper end portion of the driving shaft 14A.

A connecting shaft 17A is disposed behind the driving shaft 14A. A bevel gear unit 17a is provided on a lower end portion of the connecting shaft 17A.

An upper end portion of the connecting shaft 17A is connected to a lower end portion of the lamp unit 8. The lamp unit 8 is movable in the upward and downward direction with respect to the connecting shaft 17A.

A connecting gear 21 is disposed between the driving shaft 14A and the connecting shaft 17A. The connecting gear 21 is constituted with a shaft 21a extending in the forward and backward direction, a first gear unit 21a provided on a front end portion of the shaft 21a, and a second gear unit 21c provided on a rear end portion of the shaft 21a. Both of the first gear unit 21b and the second gear unit 21c are bevel gears. The first gear unit 21b is engaged with the bevel gear unit 14b of the driving shaft 14A, and the second gear unit 21c is engaged with the bevel gear unit 17a of the connecting shaft 17A.

Accordingly, when the driving shaft 14A is rotated, the driving force is transmitted to the connecting shaft 17A by the connecting gear 21, and thus, the connecting shaft 17A is rotated.

The first gear unit 21a of the connecting gear 21 and the bevel gear unit 14b of the driving shaft 14A are disposed inside a first box 22, and the second gear unit 21c of the connecting gear 21 and the bevel gear unit 17a of the connecting shaft 17A are disposed inside a second box 23. The second box 23 is guided by the guides 11, 11 to be movable in the forward and backward direction.

The connecting shaft 17A and the connecting gear 21 function as a connecting mechanism 20A configured to transmit the driving force of the actuator 9A to the lamp unit 8.

In the internal structure 6A configured as described above, when the driving shaft 14A of the actuator 9A is moved in the forward and backward direction, the connecting gear 21, the first box 22, the second box 23, and the connecting shaft 17A are moved integrally with the driving shaft 14A in the forward and backward direction, and the lamp unit 8 is pivoted in the upward and downward direction about the fulcrum shaft 12 as a fulcrum, thereby performing the leveling adjustment. When the leveling adjustment is performed, the connecting shaft 17A is moved in the upward and downward direction with respect to the connecting gear 21 and the first box 22 in accordance with the pivot of the lamp unit 8. Thus, the engagement position between the bevel gear unit 17a and the second gear unit 21c is changed, but the connecting shaft 17A is moved in the upward and downward direction within a range that the engagement state between the pinion gear unit 18a and the rack 16 is maintained.

Meanwhile, when the driving shaft 14A of the actuator 9A is rotated, the connecting gear 21 is rotated in accordance with the rotation of the driving shaft 14A so that the connecting shaft 17A is rotated, and the lamp unit 8 is pivoted in the leftward and rightward direction about the fulcrum shaft 12 as a fulcrum, thereby performing the swivel adjustment.

In the internal structure 6A configured as described above, it is possible to arbitrarily set a disposition angle of the actuator 9A depending on a disposition space inside the lamp case 4 by changing an inclination angle of the first gear unit 21b and the second gear unit 21c of the connecting gear 21. In addition, due to flexibility in design and effective utilization of the disposition space inside the lamp case 4, the miniaturization of the vehicular headlamp 1 may be facilitated.

Next, an internal structure 6B according to the second modified example will be described (see, e.g., FIG. 6).

Further, in the internal structure 6B as illustrated below, only a connecting mechanism and its associated structure are different from the above-described internal structure 6. Thus, only the portions different from those of the internal structure 6 will be described in detail and the other portions will be denoted by the same reference numerals as those given to the same portions in the internal structure 6 while omitting descriptions thereof.

The internal structure 6B according to the second modified example is provided with a bracket 7, a lamp unit 8, and an actuator 9B.

The actuator 9B is provided with a main body 13 and a driving shaft 14B. The actuator 9B is disposed below and in front of the lamp unit 8.

A connecting shaft 17B is disposed behind the driving shaft 14B. An upper end portion of the connecting shaft 17B is connected to a lower end portion of the lamp unit 8.

The driving shaft 14B and the connecting shaft 17B are connected by a parallel link 24. The parallel link 24 is constituted with a front portion 24a and a rear portion 24b which are disposed to be spaced apart from each other in the forward and backward direction, and lateral portions 24c, 24c which are disposed to be spaced apart from each outer in the leftward and rightward direction. Longitudinal ends of the front portion 24a, rear portion 24b, and the lateral portions 24c, 24c are pivotably connected to each other.

The driving shaft 14B is connected to the front portion 24a, and the connecting shaft 17B is connected to the rear portion 24b by being inserted therethrough. The connecting shaft 17B is movable in the upward and downward direction with respect to the rear portion 24b, but not rotatable around the shaft. The driving shaft 14B is disposed inside a box 25. The box 25 is mounted on the front portion 24a.

The connecting shaft 17B and the parallel link 24 function as a connecting mechanism 20B configured to deliver the driving force of the actuator 9B to the lamp unit 20B.

In the internal structure 6B configured as described above, when the driving shaft 14B of the actuator 9B is moved in the forward and backward direction, the parallel link 24 and the box 25 are moved integrally with the driving shaft 14B in the forward and backward direction, and the lamp unit 8 is pivoted in the upward and downward direction about the fulcrum shaft 12 as a fulcrum, thereby performing the leveling adjustment. When the leveling adjustment is performed, the connecting shaft 17B is moved in the upward and downward direction about the rear portion 24b, but the connecting shaft 17B is moved in the upward and downward direction within a range that the insertion state through the rear portion 24b is maintained.

Meanwhile, when the driving shaft 14B of the actuator 9B is rotated, the front portion 24a, the rear portion 24b, and the lateral portions 24c, 24c of the parallel link 25 are pivoted, respectively, in accordance with the rotation of the driving shaft 14B so that the connecting shaft 17B is rotated, and the lamp unit 8 is pivoted in the leftward and rightward direction about the fulcrum shaft 12 as a fulcrum, thereby performing the swivel adjustment.

In the internal structure 6B configured as described above, since the parallel link 24 is used as a connecting mechanism 20B, a disposition space of the connecting mechanism 20B is smaller in the upward and downward direction. Therefore, it is possible to avoid interference with other members as well as to facilitate miniaturization of the vehicular headlamp 1.

Next, an internal structure 6C according to the third modified example will be described (see, e.g., FIG. 7).

In the internal structure 6C as illustrated below, since some portions are different from the above-described internal structure 6 only in that a driving shaft of an actuator is used as a connecting mechanism and the actuator is disposed in an inclined state. Thus, only portions different from those of the internal structure 6 will be described in detail and the other portions will be denoted by the same reference numerals as those given to the same portions in the internal structure 6 while omitting descriptions thereof.

The internal structure 6C according to the third modified example is provided with a bracket 7, a lamp unit 8, and an actuator 9C.

A fulcrum shaft 12 is mounted on an upper end portion of the lamp unit 8 in an inclined state.

The actuator 9C is disposed below and in front of the lamp unit 8. The actuator 9C is provided with a main body 13 and a driving shaft 14C. The actuator 9C is mounted on mounting portions 10, 10 in an inclined state with respect to a horizontal surface, and is inclined to be displaced rearward as the driving shaft 14C goes upward. An upper end portion of the driving shaft 14C is connected to a lower end portion of the lamp unit 8. The lamp unit 8 is pivotable in the upward and downward direction with respect to the driving shaft 14C.

The driving shaft 14C of the actuator 9C functions as a connecting shaft 17C, as well as a connecting mechanism 20C configured to transmit the driving force of the actuator 9C to the lamp unit 8.

In the internal structure 6C configured as described above, when the driving shaft 14C of the actuator 9C is moved in the forward and backward direction, the lamp unit 8 is pivoted in the upward and downward direction about the fulcrum shaft 12 as a fulcrum, thereby performing the leveling adjustment.

Meanwhile, when the driving shaft 14C of the actuator 9C is rotated, the lamp unit 8 is pivoted in the leftward and rightward direction about the fulcrum shaft 12 as a fulcrum, thereby performing the swivel adjustment.

In the internal structure 6C configured as described above, since the driving shaft 14C (connecting shaft 17C) is used as the connecting mechanism 20C, it is possible to reduce the number of parts. Further, since the structure is simple, it is possible to reduce the manufacturing cost of the vehicular headlamp 1.

Internal Structure According to Second Exemplary Embodiment

Figure 8:
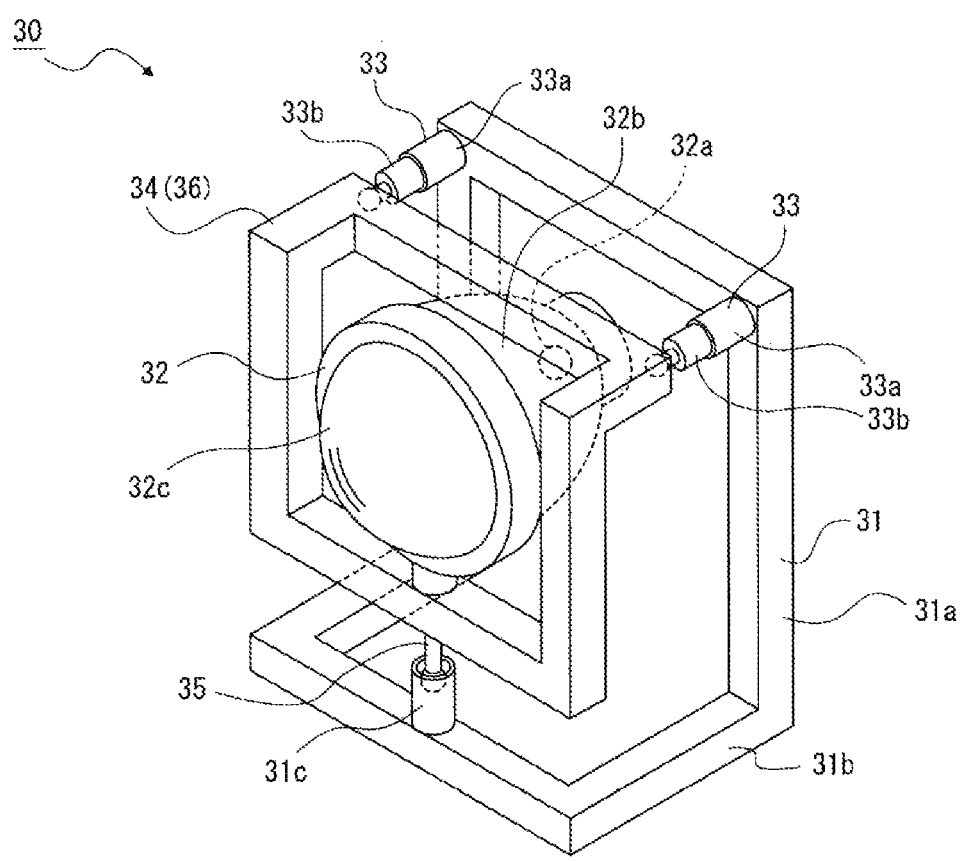
FIG. 8 is a perspective view of an internal structure according to a second exemplary embodiment.

Hereinafter, a configuration of an internal structure 30 according to the second exemplary embodiment will be described in detail (see FIG. 8).

The internal structure 30 is provided with a bracket 31, a lamp unit 32, and actuators 33, 33.

The bracket 31 is constituted with a U-shaped first portion 31a that is opened downward, and a U-shaped second portion 31a that is opened rearward. A lower end portion of the first portion 31a and a rear end portion of the second portion 31a are provided to be continued. A bearing protrusion 31c protruding upward is provided at a central portion in the leftward and rightward direction of a front end portion of the second portion 31a.

The lamp unit 8 is, for example, a projector-type unit provided with a light source 32a, a reflector 32b, and a projector lens 32c.

The actuators 33, 33 function to adjust an optical axis of the lamp unit 32. The actuators 33, 33 are disposed on an upper end portion of the first portion 31a of the bracket 31 behind the lamp unit 32 to be spaced apart from each other in the leftward and rightward direction. The actuators 33, 33 perform a leveling adjustment for adjusting a direction of the optical axis changed with weight of in-vehicle loads by pivoting the lamp unit 32 in the upward and downward direction with respect to the bracket 31, as well as a swivel adjustment for adjusting a direction of the optical axis in accordance with a travelling direction of the vehicle by pivoting the lamp unit 32 in the leftward and rightward direction with respect to the bracket 31.

The actuators 33, 33 may be, for example, shaft-like plungers that are movable in the forward and backward direction. Each actuator 33 is provided with a fixed portion 33a that is mounted on the bracket 31 and a movable portion 33b that is movable in the forward and backward direction with respect to the fixed portion 33a.

The lamp unit 32 is held in a frame-like connecting member 34. A lower end portion of the lamp unit 32 is connected to a lower end portion of the connecting member 34.

A connecting shaft 35 protruding downward is mounted on a central portion in the leftward and rightward direction of the lower end portion of the connecting member 34. A lower end portion of the connecting shaft 35 is connected to the bearing protrusion 31c of the bracket 31. A displacement absorbing unit (not illustrated) is provided in a connecting portion of the connecting shaft 35 and the bearing protrusion 31c. The connecting shaft 35 is connected to be pivotable in the leftward and rightward direction and upward and downward direction with respect to the bearing protrusion 31c.

The movable portions 33b, 33b of the respective actuators 33, 33 are connected to both left and right ends of the upper end portion of the connecting member 34, respectively. The connecting member 34 is connected to be pivotable in the leftward and rightward direction and upward and downward direction with respect to the front end portions of the movable portions 33b, 33b.

The connecting member 34 functions as a connecting mechanism 36 configured to transmit the driving force of the actuators 33, 33 to the lamp unit 32.

In the internal structure 30 configured as described above, when the movable portions 33b, 33b of the actuators 33, 33 are moved by the same stroke in the same direction, the connecting member 34 and the lamp unit 32 are pivoted in the upward and downward direction about the lower end portion of the connecting shaft 35 as a fulcrum with respect to the bracket 31, and the lamp unit 32 is pivoted in the upward and downward direction, thereby performing the leveling adjustment. When the leveling adjustment is performed, the vertical position of the connecting shaft 35 in its lower end portion is changed in accordance with the pivot of the connecting member 34. However, the change of the vertical position of the connecting shaft 35 with respect to the bearing protrusion 31c is absorbed by the displacement absorbing unit provided in the connecting portion of the connecting shaft 35 and the bearing protrusion 31c, thereby smoothly performing the leveling adjustment.

Meanwhile, when the movable portions 33b, 33b of the actuators 33, 33 are moved in the opposite directions, the connecting member 34 and the lamp unit 32 are pivoted in the leftward and rightward direction about the connecting shaft 35 as a fulcrum with respect to the bracket 31, thereby performing the swivel adjustment.

In the internal structure 30 configured as described above, a fulcrum axis serving as a rotation fulcrum portion of the swivel adjustment is not present above the lamp unit 32. Thus, the internal structure 30 may be miniaturized in the upward and downward direction and hence, miniaturization of the vehicular headlamp 1 may be facilitated.

Further, since shaft-like plungers are used as the actuators 33, 33, the disposition space of the actuators 33, 33 may be reduced. Therefore, the structure of the vehicular headlamp 1 may be simplified and the miniaturization of the vehicular headlamp 1 may be further facilitated.

<Summary>

As described above, the vehicular headlamp 1 is provided with the actuator 9, 9A, 9B, 9C, or 33 configured to pivot the lamp unit 8 to adjust an irradiation direction of light emitted from the light source 8a, and the connecting mechanism 20, 20A, 20B, 20C, or 36 configured to connect the lamp unit 8 and the actuator 9, 9A, 9B, 9C, or 33 to transmit the driving force of the actuator 9, 9A, 9B, 9C, or 33 to the lamp unit 8. The actuator 9, 9A, 9B, 9C, or 33 is disposed in front of or behind the lamp unit 8.

Accordingly, the vehicular headlamp 1 is formed in conformity with a mounting space for the vehicular headlamp 1 formed in a vehicle body, and thus, good mountability onto a vehicle body may be ensured.

Internal Structure According to Third Exemplary Embodiment

Hereinafter, a configuration of an internal structure 40 according to the third exemplary embodiment will be described in detail (see, e.g., FIGS. 9 to 11).

Figure 9:
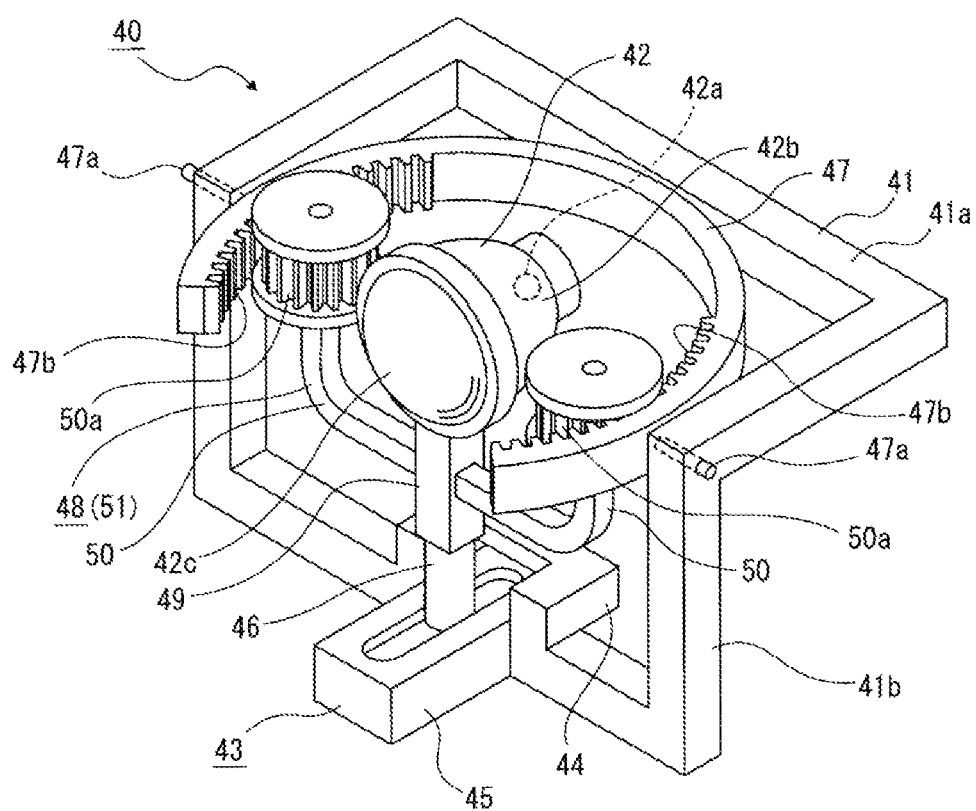
FIG. 9 is a perspective view of an internal structure according to a third exemplary embodiment.

The internal structure 40 is provided with a bracket 41, a lamp unit 42, and an actuator 43 (see, e.g., FIG. 9).

The bracket 41 is constituted with a U-shaped first portion 41a that is opened forward, and a U-shaped second portion 41b that is opened upward. A front end portion of the first portion 41a and an upper end portion of the second portion 41b are provided to be continued.

An actuator mounting portion 44 is provided on a lower end portion of the second portion 41b of the bracket 41.

The lamp unit 42 is, for example, a projector-type unit provided with a light source 42a, a reflector 42b, and a projector lens 42c.

The actuator 43 functions to adjust an optical axis of the lamp unit 42, and is disposed below the lamp unit 42. The actuator 43 performs a leveling adjustment for adjusting a direction of the optical axis changed with weight of in-vehicle loads by pivoting the lamp unit 42 in the upward and downward direction with respect to the bracket 41, as well as a swivel adjustment for adjusting a direction of the optical axis in accordance with a travelling direction of the vehicle by pivoting the lamp unit 42 in the leftward and rightward direction with respect to the bracket 41.

The actuator 43 is provided with a main body 45 having a driving gear (not illustrated) disposed therein, and a driving shaft 46 protruding upward from the main body 45 and configured to be moved or rotated by the driving gear in the forward and backward direction. The main body 45 of the actuator 43 is mounted on the actuator mounting portion 44.

A support 47 formed in an arc shape is supported pivotably on the bracket 41. The support 47 is formed in a shape that is opened forward and provided with fulcrum shafts 47a, 47a protruding in left and right sides. The fulcrum shafts 47a, 47a of the support 47 is supported in the continued portion between the first portion 41a and the second portion 41b of the bracket 41.

Racks 47b, 47b are formed at both left and right end portions of an inner peripheral surface of the support 47, respectively.

A connecting body 48 is connected to a lower end portion of the lamp unit 42. The connecting body 48 is provided with a connector 49 that extends in the upward and downward direction, and arms 50, 50 that protrude from the connector 49 in directions opposite to each other. Gear units 50a, 50a are provided at tip ends of the arms 50, 50, respectively.

In the connecting body 48, an upper end portion of the connector 49 is mounted on a lower end portion of the lamp unit 42, and a lower end portion of the connector 49 is connected to an upper end portion of the driving shaft 46. A displacement absorbing unit (not illustrated) is provided in a connecting portion of the connector 49 and the driving shaft 46. The connector 49 is pivotable in the leftward and rightward direction with respect to the driving shaft 46.

The connecting body 48 functions as a connecting mechanism 51 configured to transmit the driving force of the actuator 43 to the lamp unit 42.

Figure 10:
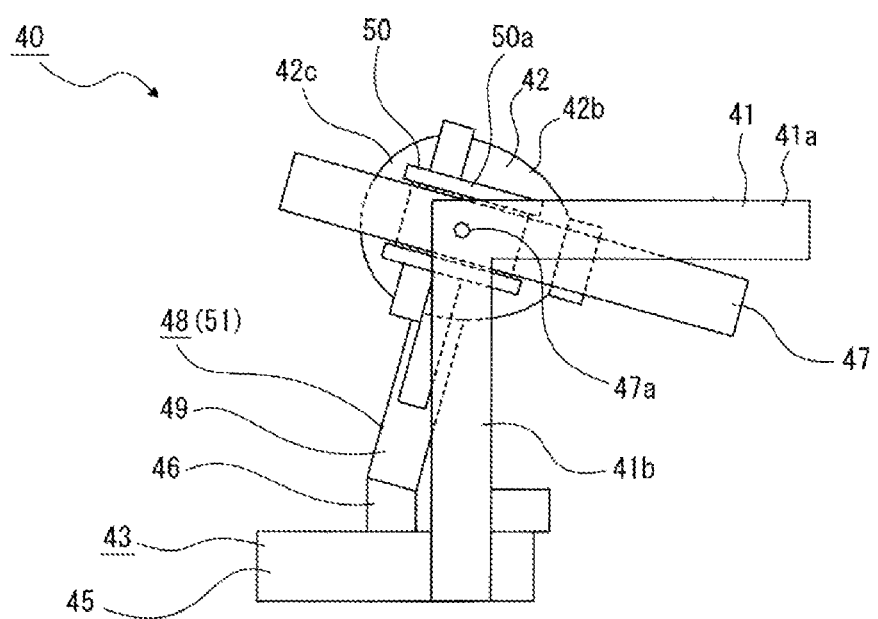
FIG. 10 is a side view illustrating a state in which a leveling adjustment is performed in the internal structure according to the third exemplary embodiment.
Figure 11:
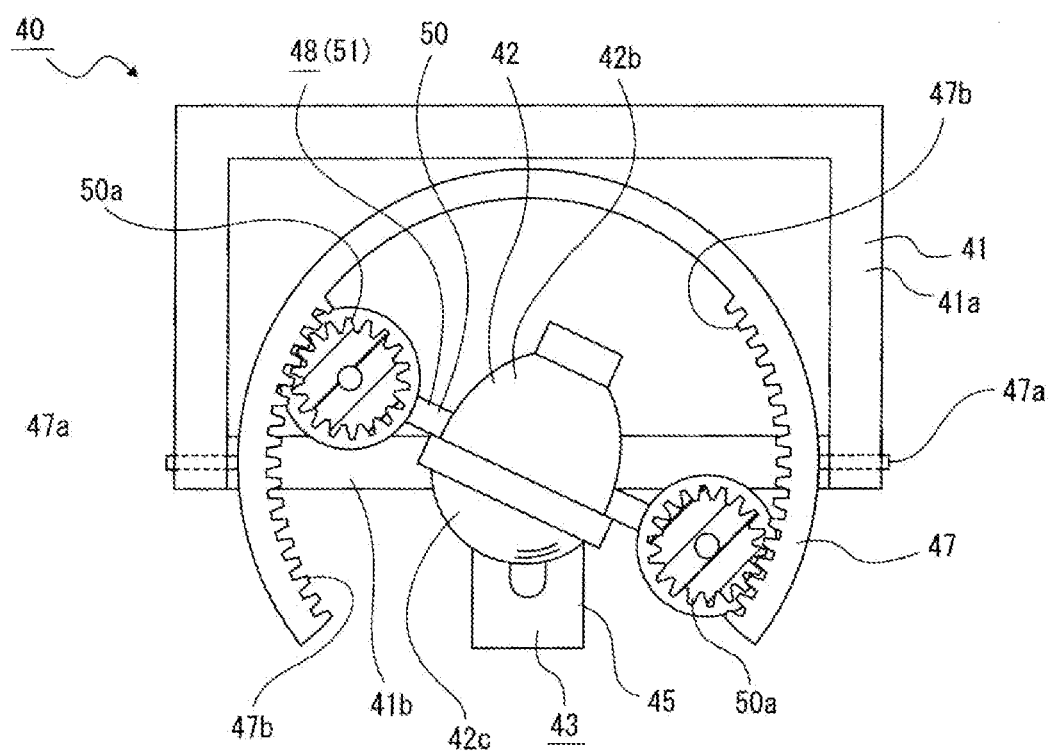
FIG. 11 is a plan view illustrating a state in which a swivel adjustment is performed in the internal structure according to the third exemplary embodiment.

In the internal structure 40 configured as described above, when the driving shaft 46 of the actuator 43 are moved in the forward and backward direction, the connecting body 48, the lamp unit 42, and support 47 are pivoted integrally about the fulcrum shafts 47a, 47a as fulcrums with respect to the bracket 41 in accordance with the movement of the driving shaft 46, and the lamp unit 42 is pivoted in the upward and downward direction, thereby performing the leveling adjustment (see, e.g., FIG. 10). When the leveling adjustment is performed, the vertical position of the connector 49 in its lower end portion with respect to the driving shaft 46 is changed in accordance with the pivot of the connector 49. However, the change of the vertical position of the connector 49 with respect to the driving shaft 46 is absorbed by the displacement absorbing unit provided in the connecting portion of the connector 49 and the driving shaft 46, thereby smoothly performing the leveling adjustment.

Meanwhile, when the driving shaft 46 of the actuator 43 is rotated, the gear units 50a, 50a of the connecting body 48 are moved with respect to the racks 47b, 47b of the support 47 in accordance with the rotation of the driving shaft 46, and thus, the connecting boy 48 and the lamp unit 42 are pivoted integrally, thereby performing the swivel adjustment.

In the internal structure 40 configured as described above, a fulcrum axis serving as a rotation fulcrum portion of the swivel adjustment is not present above the lamp unit 42. Thus, the internal structure 40 may be miniaturized in the upward and downward direction and hence, miniaturization of the vehicular headlamp 1 may be facilitated.

Further, since the connecting body 48 coupled to the lamp unit 42 is supported by the support 47, and the support 47 is supported by the bracket 41, the structure is well balanced. Therefore, it is possible to enhance the durability.

Internal Structure According to Fourth Exemplary Embodiment

Figure 12:
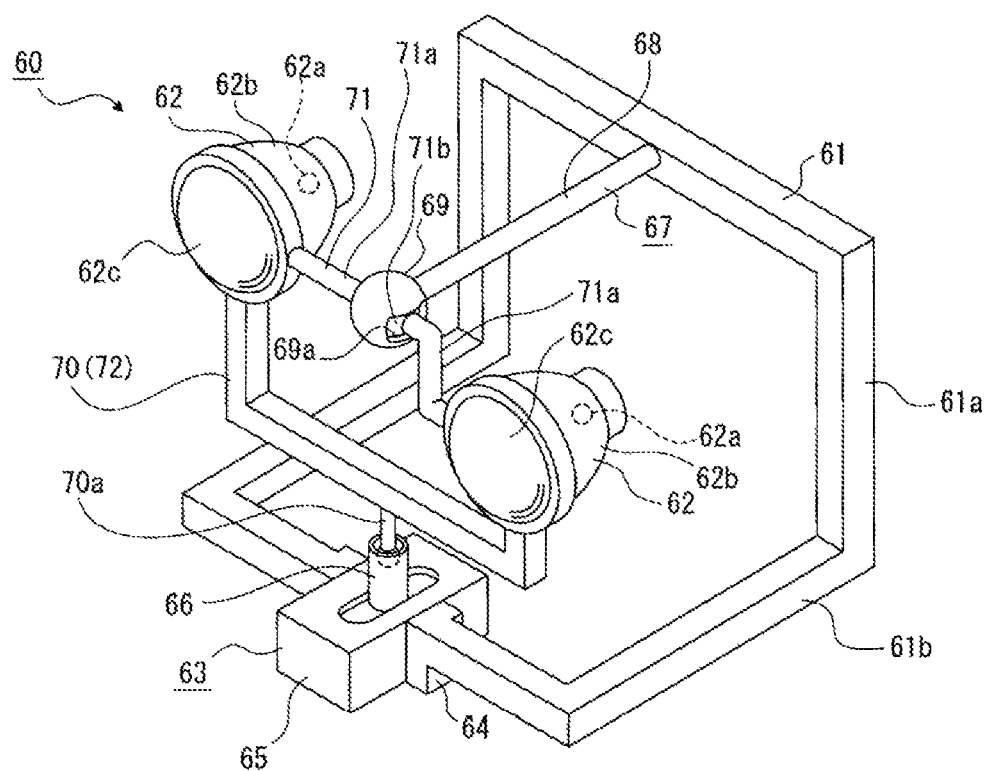
FIG. 12 is a perspective view of an internal structure according to a fourth exemplary embodiment.

Hereinafter, a configuration of an internal structure 60 according to the fourth exemplary embodiment will be described in detail (see, e.g., FIG. 12).

The internal structure 60 is provided with a bracket 61, lamp units 62, 62, and an actuator 63.

The bracket 61 is constituted with a U-shaped first portion 61a that is opened downward, and a U-shaped second portion 61b that is opened rearward. A lower end portion of the first portion 61a and a rear end portion of the second portion 61b are provided in succession. An actuator mounting portion 64 is provided on a central portion in the leftward and rightward direction of a front end portion of the second portion 61b.

Each lamp unit 62 is, for example, a projector-type unit provided with a light source 62a, a reflector 62b, and a projector lens 62c. One lamp unit 62 is, for example, for high beam, and the other lamp unit 62 is, for example, for low beam.

The actuator 63 functions to adjust an optical axis of the lamp units 62, 62, and is disposed below the lamp units 62, 62. The actuator 63 performs a leveling adjustment for adjusting a direction of the optical axis changed with weight of in-vehicle loads by pivoting the lamp units 62, 62 in the vertical direction with respect to the bracket 61, as well as a swivel adjustment for adjusting a direction of the optical axis in accordance with a travelling direction of the vehicle by pivoting the lamp units 62, 62 in the leftward and rightward direction with respect to the bracket 61.

The actuator 63 is provided with a main body 65 having a driving gear (not illustrated) disposed therein, and a driving shaft 66 protruding upward from the main body 65 and configured to be moved or rotated by the driving gear in the forward and backward direction. The main body 65 of the actuator 63 is mounted on the actuator mounting portion 64.

A connecting protrusion 67 protruding forward is mounted on an upper end portion of the first portion 61a of the bracket 61. The connecting protrusion 67 is constituted with a mounting shaft 68 that extends in the forward and backward direction, and a supporting portion 69 having a spherical outer surface that is continuous with a front end portion of the mounting shaft 68. Arc-shaped shaft inserting holes 69a, 69a extending in the forward and backward direction are formed at both left and right end portions of the supporting portion 69.

The lamp units 62, 62 are positioned to be spaced apart from each other in the leftward and rightward direction, and connected to each other through a connecting bar 70 in their bottom. The connecting bar 70 is provided with a connecting shaft 70a that protrudes downward from a central portion in the leftward and rightward direction of the connecting bar 70. A lower end portion of the connecting shaft 70a is connected to the driving shaft 66. A displacement absorbing unit (not illustrated) is provided in a connecting portion of the connecting shaft 70 and the driving shaft 66. The connecting shaft 70a is connected so as to be pivotable in the upward and downward direction but not in the leftward and rightward direction about the driving shaft 66.

A support 71 is attached to the lamp units 62, 62. The support 71 is disposed between the lamp units 62, 62, and constituted with supporting shaft portions 71a, 71a which are disposed to be spaced apart from each other in the leftward and rightward direction, and a spherical portion 71b which is provided between the supporting shaft portions 71a, 71a.

In the support 71, outer ends of the supporting shaft portions 71a, 71a are connected to the lamp units 62, 62, and inner ends of the supporting shaft portions 71a, 71a are inserted through shaft inserting holes 69a, 69a formed in the supporting portion 69 of the connecting protrusion 67 such that the spherical portion 71a is disposed inside the supporting portion 69. Therefore, the support 71 is supported rotatably in any direction by the supporting portion 69.

The connecting bar 70 functions as a connecting mechanism 72 configured to deliver the driving force of the actuator 63 to the lamp units 62, 62.

In the internal structure 60 configured as described above, when the driving shaft 66 of the actuator 63 are moved in the forward and backward direction, the connecting bar 70, the lamp units 62, 62, and support 71 are pivoted in the upward and downward direction about the lower end portion of the connecting bar 70 and the spherical portion 71a of the support 71 as fulcrums with respect to the bracket 61, and the lamp units 62, 62 are pivoted in the upward and downward direction, thereby performing the leveling adjustment. When the leveling adjustment is performed, the vertical position of the connecting bar 70 in its lower end portion is changed in accordance with the pivot of the connecting bar 70. However, the change of the vertical position of the connecting bar 70 with respect to the driving shaft 66 is absorbed by the displacement absorbing unit provided in the connecting portion of the connecting bar 70 and the driving shaft 66, thereby smoothly performing the leveling adjustment.

Meanwhile, when the driving shaft 66 of the actuator 63 is rotated, the connecting bar 70, the lamp units 62, 62, and the support 71 are pivoted in the leftward and rightward direction about the connecting shaft 70a of the connecting bar 70 and the spherical portion 71b with respect to the bracket 61, thereby performing the swivel adjustment.

In the internal structure 60 configured as described above, a fulcrum axis serving as a rotation fulcrum portion of the swivel adjustment is not present above the lamp units 62, 62. Thus, the internal structure 60 may be miniaturized in the upward and downward direction and hence, miniaturization of the vehicular headlamp 1 may be facilitated.

Further, since the actuator 63 is only disposed below the lamp units 62, 62, the structure of the vehicular headlamp 1 may be simplified and the miniaturization of the vehicular headlamp 1 may be further facilitated.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A vehicular headlamp comprising:
    a lamp unit provided with a light source and configured to be pivotable in an upward and downward direction as well as in a leftward and rightward direction;
    an actuator including a driving shaft configured to rotate and move in a forward and backward direction in order to pivot the lamp unit thereby adjusting an irradiation direction of light emitted from the light source; and
    a connecting mechanism configured to connect the lamp unit and the actuator in order to transmit a driving force of the actuator to the lamp unit,
    wherein the actuator is disposed in front of or behind the lamp unit,
    wherein the connecting mechanism includes:
    a slider configured to be movable in the forward and backward direction, the slider including a first inserting hole which the driving shaft passes through and a second inserting hole spaced apart from the first inserting hole;

a rack configured to be engaged with a gear unit of the driving shaft and to be moved with the slider in the forward and backward direction; and a connecting shaft connected to a lower end portion of the lamp unit and configured to be inserted through the second inserting hole of the slider, and a pinion gear unit, which is engaged with the rack, is formed on a portion of a peripheral surface of the connecting shaft;

when the driving shaft of the actuator is moved in the forward and backward direction, the actuator performs a levelling adjustment for adjusting a direction of an optical axis changed with weight of in-vehicle loads by pivoting the lamp unit in the upward and downward direction, and when the driving shaft of the actuator is rotated, the actuator performs a swivel adjustment for adjusting a direction of the optical axis in accordance with a travelling direction of a vehicle by pivoting the lamp unit in the leftward and rightward direction.

2. The vehicular headlamp of claim 1, wherein when the driving shaft of the actuator is moved in the forward and backward direction, the slider, the rack, and the connecting shaft are moved integrally with the driving shaft in the forward and backward direction such that the lamp unit is pivoted in the upward and downward direction, thereby performing the levelling adjustment.

3. The vehicular headlamp of claim 2, wherein the connecting shaft is moved in the upward and downward direction with respect to the slider and the rack in accordance with the pivot of the lamp unit.

4. The vehicular headlamp of claim 2, wherein the connecting shaft is moved in the upward and downward direction within a range in which the engagement state of the pinion gear unit and the rack is maintained.

5. The vehicular headlamp of claim 1, wherein when the driving shaft of the actuator is rotated, the rack is moved in the forward and backward direction in accordance with the rotation of the driving shaft such that the connecting shaft is rotated about the rack and the lamp unit is pivoted in the leftward and rightward direction, thereby performing the swivel adjustment.

* * * * *